Sept. 30, 1924.
W. F. GOODWIN
MILK BOTTLE CLOSURE
Filed June 18, 1923
1,510,397
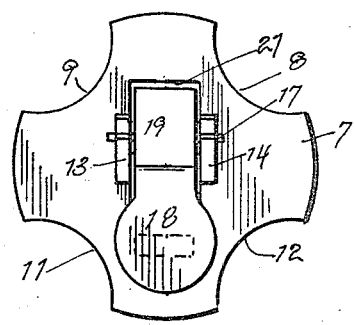
Fig. I.
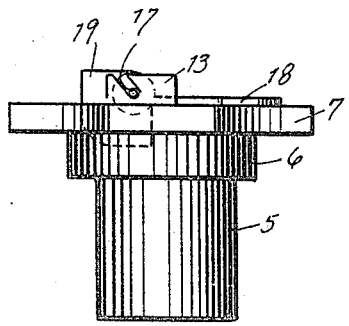
Fig. II.
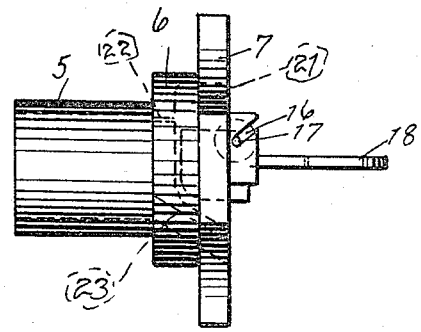
Fig. III.
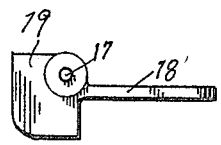
Fig. IV.
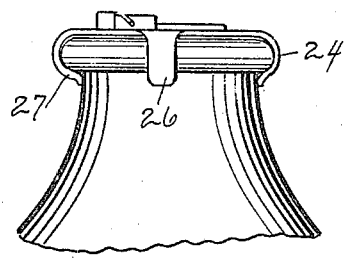
Fig. V.
INVENTOR.
WM. F. GOODWIN
BY *Victor J. Evans*
ATTORNEY.

Patented Sept. 30, 1924.

1,510,397

UNITED STATES PATENT OFFICE.

WILLIAM F. GOODWIN, OF SAN FRANCISCO, CALIFORNIA.

MILK-BOTTLE CLOSURE.

Application filed June 18, 1923. Serial No. 646,118.

*To all whom it may concern:*

Be it known that I, WILLIAM F. GOODWIN, a citizen of the United States, residing at San Francisco, in the county of San Francisco and State of California, have invented new and useful Improvements in Milk-Bottle Closures, of which the following is a specification.

This invention relates to improvements in milk bottle closures.

The principal object of this invention is to produce a closure which may be applied to any milk bottle from which the paper cap has been removed.

Another object is to produce a closure through which the contents of the bottle may be dispensed.

A still further object is to produce a device of this character which is extremely simple, neat in appearance, easy to apply and remove, and one which will be sanitary.

Other objects and advantages will be apparent during the course of the following description.

In the accompanying drawings forming a part of this specification, and in which like numerals are employed to designate like parts throughout the same, Figure 1 is a top plan view of my device, Figure 2 is a side elevation of Figure 1, Figure 3 is a view similar to Figure 2, showing the valve in open position, Figure 4 is a side elevation of the valve removed from the device, and Figure 5 is a modified form of my device, applied to the top of a bottle.

In dispensing milk from a bottle, it is essential that sanitary means be provided.
When pouring milk from an ordinary bottle, the milk comes in contact with the top of the bottle, which may have been handled in such a manner as to have become contaminated.

I have therefore provided a closure which may be inserted in a bottle so that the contents thereof will be dispensed through the device thereby eliminating any possibility of contamination.

In the accompanying drawings wherein for the purpose of illustration is shown a preferred embodiment of my invention, the numeral 5 designates a tubular portion adapted to be inserted within the bottle. This tubular portion has an enlargement 6 formed integral therewith, which enlargement is adapted to have a rubber gasket removably secured thereon. A top 7 is also formed integral with the enlargement 6 and is formed so as to provide recesses 8, 9, 11 and 12. These recesses form a convenient means for inserting and removing the top, giving a firm finger hold.

Formed upon the top 7 are upstanding lugs 13 and 14, each of which is recessed as shown at 16, which recesses are on an angle of substantially 60°. The purpose of this recess is to provide for a shaft 17, to which shaft is secured a valve 18 having a counterweight 19 (see Figure 4.) This counterweight is sufficient to balance the valve 18 so as to normally hold the valve in the position shown in Figure 1.

When the device is turned to the position shown in Figure 3, the counterweight moves into a recess, shown in dotted lines at 21, in Figure 3, formed in the top 7. An air vent 22 is provided from this recess to the interior of the tubular portion 6. While a passage-way 23 extends from the interior of the tubular portion 6 to a point below the valve 18, as shown in dotted lines in Figure 3. In the modified form shown in Figure 5 the same construction is employed with the exception that spring clips 24, 26 and 27 are employed for the purpose of holding the device upon the top of the bottle.

It will thus be seen that I have provided a very simple structure which may be applied to any bottle and one which automatically closes when the container is righted, and one which will prevent contamination of the contents of the bottle.

It is to be understood that the form of my invention, herewith shown and described is to be taken as a preferred example of the same and that various changes in the shape, size and arrangement of parts may be resorted to without departing from the spirit of the invention, or the scope of the subjoined claim.

Having thus described my invention, I claim:—

In a device of the character described a tubular portion, an enlarged portion formed integral therewith and having a head formed thereon, said head having recesses formed on its edge, upstanding lugs formed on said head and having inclined recesses formed therein, a recess formed in said head at a point below the plane of said head, a valve comprising a flat portion, a counter-weight formed integral therewith, a pivot extending through said valve at a point adjacent said counter-weight, said valve being capable of contacting the face of said head when said head is in a horizontal position, substantially as and for the purpose specified.

In testimony whereof I affix my signature.

WILLIAM F. GOODWIN.